United States Patent Office 3,185,925
Patented May 25, 1965

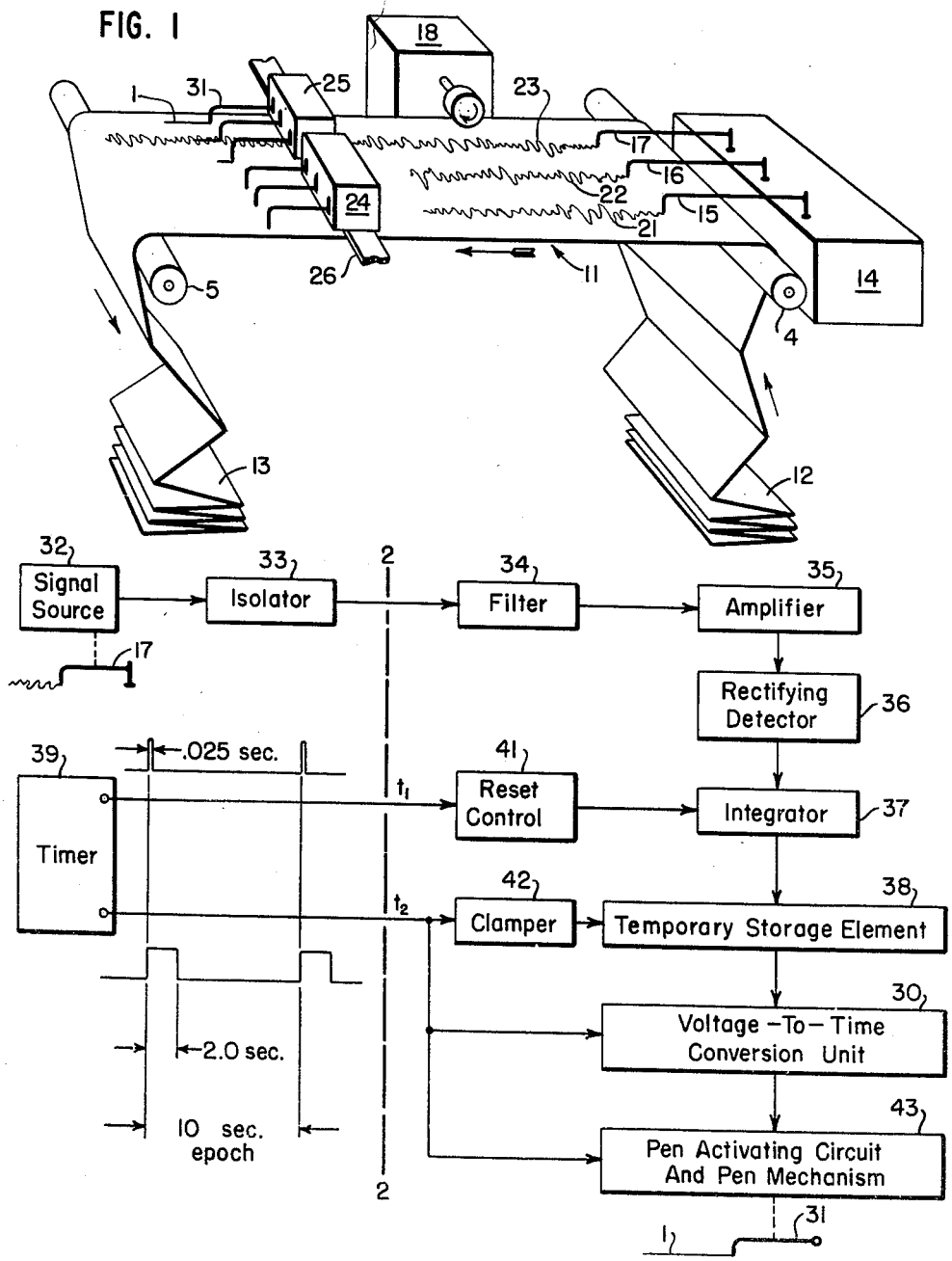

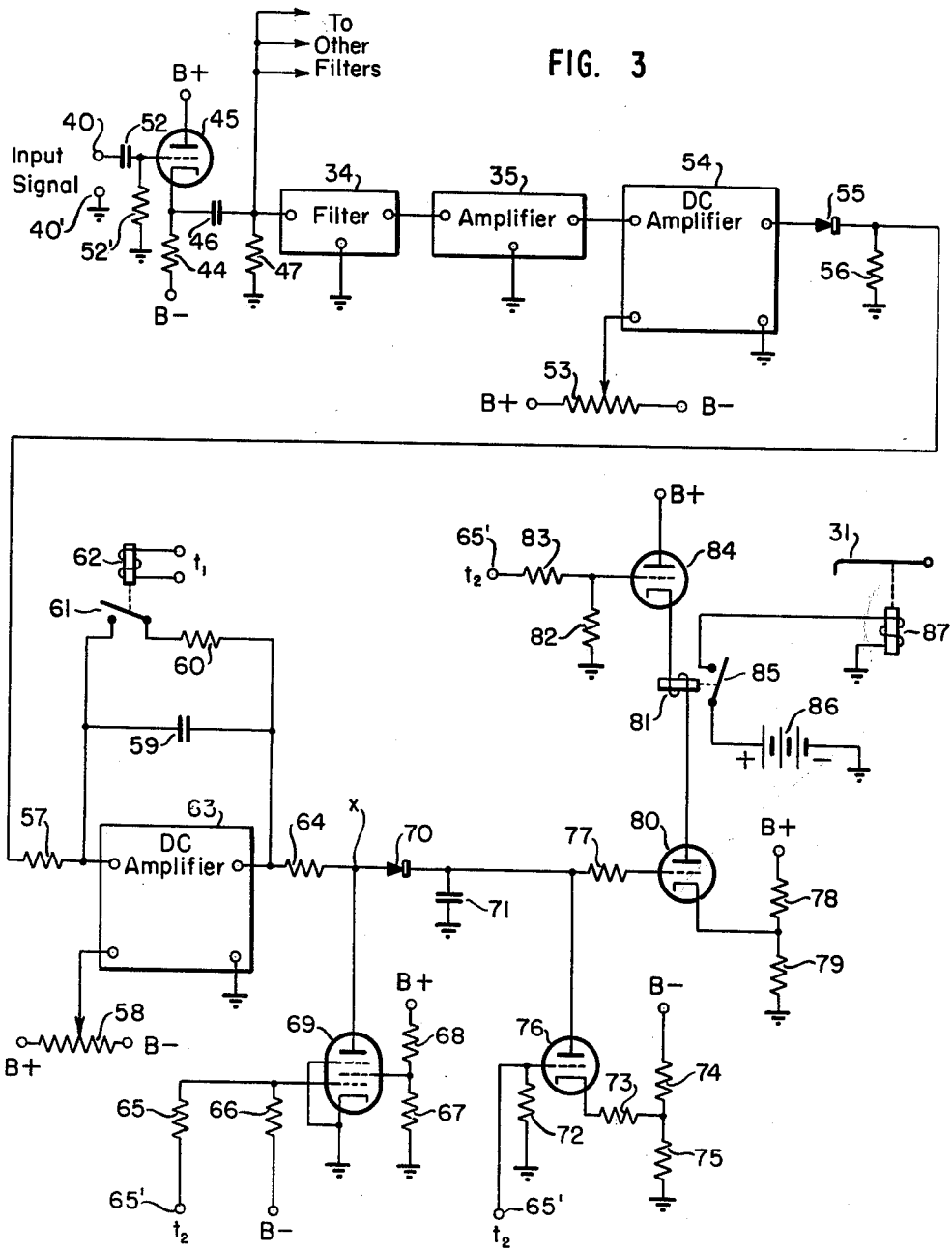

3,185,925
ELECTROENCEPHALOGRAPHIC ANALYZING AND RECORDING APPARATUS
Albert M. Grass, 77 Reservoir Road, Quincy, Mass.
Filed Aug. 16, 1960, Ser. No. 49,861
12 Claims. (Cl. 324—77)

This invention relates generally to graphic recorders for generating traces indicative of electrical signal waveforms, and more particularly it is concerned with electroencephalographic recording apparatus.

As electrical signals derived from human or animal subjects in accordance with electroencephalographic procedures generally have highly complex waveforms, it becomes a problem to determine the significance of these waveforms and to compare them. As an aid to this end, it has been proposed heretofore to provide waveform analyzing apparatus which is adapted to produce a printed record of the relative magnitudes of selected frequency components of the waveform, the same to be produced during predetermined time intervals called epochs. The difficulty with apparatus of this kind has been that appreciable time was required to analyze and to write out the results of the analysis of the waveforms. In consequence, the testing time for subjects has been longer than would be otherwise desirable tending to destroy the continuity of observations upon the subject and making diagnosis more difficult.

It is an object of the present invention, therefore, to provide a visual indication of frequency components in electroencephalograms at relatively frequent intervals, particularly during the actual time of recording of the electroencephalograms.

Another object of the invention is to provide a form of analysis which is easy to read and can be readily associated with the waveform on which it is based.

Still another object is to provide simultaneous indications of the relative magnitudes of selected frequency components.

A further object is to provide apparatus of the above-mentioned character which avoids the problem of distortion which attends the generation of traces with conventional pen actuating mechanisms.

A still further object is to provide simple and reliable apparatus for developing and indicating an analysis of the above-mentioned character.

The novel features of the invention together with further objects and advantages will become readily apparent from the following detailed description and the drawings to which it refers. In the drawing:

FIG. 1 is a perspective view illustrating in semidiagrammatic form conventional electroencephalographic write out apparatus together with the write out apparatus of the invention;

FIG. 2 is a block diagram of the apparatus of the invention;

FIG. 3 is a schematic diagram of circuitry to implement the apparatus illustrated in block form in FIG. 2.

With reference first to FIG. 1, it will be observed that the numeral 11 refers to the usual form of chart found in an electroencephalographic recorder and the numerals 12 and 13 refer to the chart paper supply pack and record pack respectively. Disposed above the chart paper towards the right of FIG. 1 there is shown diagrammatically a conventional writing assembly 14 in which are mounted writing pens 15–17 for writing on the chart paper as it is pulled along by a chart drive mechanism 18. In practice more than three such pens are generally provided but these have not been shown as they are immaterial to the principles of the invention. The same is true of the individual mechanisms for amplifying the electroencephalographic signals, and actuating the pens 15–17, it being sufficient to understand that each pen is caused to move across the chart at right angles to the direction of travel of the chart in response to signals having complex waveforms which are obtained from the subject under test in accordance with conventional electroencephalographic procedures well known to those skilled in the art. The traces produced by the pens 15–17, known as electroencephalograms, are designated 21–23.

Thus far what has been described is found in conventional electroencephalographic recording apparatus. In accordance with the present invention, there is provided an additional pair of writing mechanisms 24 and 25 which are spaced transversely of one another and with respect to the writing assembly 14 are spaced longitudinally in the direction of normal chart travel. These writing mechanisms are carried by a guide 26 which permits adjustments to be made in their transverse positions. Thus, writing mechanisms 24 or 25 may be positioned to superimpose analytical information upon any of the standard electroencephalograms to which the analysis pertains. As shown by way of example, analytical writing mechanism 24 is positioned to write out over the electroencephalogram 21 and, correspondingly, analytical writing mechanism 25 is positioned to write out over electroencephalogram 23. Preferably, the write out is executed with a different colored ink from that used for the electroencephalograms, themselves.

The information written by each writing mechanism 24, 25 takes the form of a group of lines one above the other in a manner reminiscent of a bar graph. Each line serves to indicate by its length, the relative magnitude of a particular frequency component of the waveform to which it pertains during a period of time known as an epoch. It will be appreciated that more than two such writing mechanisms for recording the analysis of additional electroencephalograms can be provided, although owing to space limitations the permissible number of writing mechanisms will generally be less than the total number of electroencephalograms on the one chart. However, additional guides similar to guide 26 can be included which will make it possible to include any optional number of writing mechanisms such as writing mechanisms 24 and 25.

The general manner in which each of the waveforms is analyzed and the manner in which the representation of the analysis is produced will best be understood by reference to FIG. 2. In FIG. 2, the electroencephalographic waveform tracing pen 17 is shown together with a pen 31 which is representative of one of several such pens associated with the writing mechanism 24 of FIG. 1. The electroencephalographic apparatus which derives a signal for activation of the pen 17 is shown as a signal source 32. In accordance with the invention, there is coupled to the source 32, an isolator 33, and there is coupled to the isolator a filter 34. The isolator 33 serves to provide isolation between the source and the filter while the filter serves to transmit to an amplifier 35 a particular selected frequency component of the electroencephalographic signal under analysis. By way of example, the filter 34 may comprise a simple passive resonant circuit having a quality factor in the neighborhood of 7.5. This type of filter is preferred over an electronic filter for reasons of stability and reliability at the frequencies of interest.

Coupled to the output of the amplifier 35 is a rectifying detector 36 to convert the alternating voltage frequency component transmitted by the filter into a pulsating direct voltage. This pulsating voltage is time-integrated by an integrator 37, whose integration time period corresponds to the predetermined epoch time. The resulting voltage at the output of the integrator 37 is stored temporarily in a storage element 38. On signal from a timing device 39, the integrator is conditioned by a reset control 41 to begin a new integrating cycle or epoch while the final integrator output voltage having been temporarily stored in element 38 is applied to a voltage-to-time conversion unit 30. In addition, there is provided a clamping unit 42 which, in response to a signal from the timer 39, effectively isolates the storage element from the integrator until the write-out process is completed. The voltage-to-time converter 30 supplies to a write circuit 43 a uniform signal whose time duration is proportional to the voltage stored in the temporary storage element. Write circuit 43 in turn activates the pen 31 for the time duration of the signal applied thereto.

More specifically, in describing the operation of the apparatus, it will be assumed that the integrator has just been reset by a timing signal of 0.25 second duration. Upon termination of this signal, the integrator is enabled to integrate the voltage from the detector and hence a build up of voltage occurs at the output of the integrator, which voltage is caused to appear on the temporary storage element 38. Since the detector voltage is derived from the output of the filter, it follows that the magnitude of the integrator output voltage is representative of the accumulated energy associated with the frequency component passed by the filter. After a predetermined period or epoch, such as ten seconds, during which this voltage build up occurs, the storage element is then effectively isolated from the integrator on signal from the timer as indicated. At this time, a substantially linear decay of the voltage stored in element 38 is effected by unit 30 and the write-out circuit 43 is actuated for so long as the storage element voltage exceeds a predetermined value. Activation of the write-out circuit 43, in turn, causes the pen 31 to provide a mark or trace on the moving chart, the length of the trace being a linear function of the time-averaged magnitude of the frequency component of the source signal that is transmitted by the filter; the time of averaging by the integrator corresponding to one epoch. Preferably, the voltage-to-time conversion unit is constructed such that it will cause positive deactivation of the corresponding writing pen 31 at the end of a predetermined period such as two seconds. After the two-second write out limit has occurred, the storage element is once again enabled to store the voltage accumulation of the integrator output. During the two second period that the write out occurs, however, it should be noted that the integrator is nevertheless conditioned to respond to the detector voltage except for the relatively short 0.25 second interval required to perform the resetting function. In this way, a very nearly continuous waveform analysis is effected independent of the action of the associated write-out system.

By now it will be apparent that the other line traces immediately adjacent to trace 1 in FIG. 1 are made by other pens like pen 31 which have connected to them individual circuitries like that of FIG. 2 wherein the filter elements of each pen channel are adapted to transmit other particular frequency components. Specifically, there will be provided for each such pen all of the elements toward the right of the dotted line 2—2 in FIG. 2, the timer 39 and the isolator 33 being common to all the pens associated with the writing mechanism 24. Writing mechanism 25 and its associated pens are arranged in like manner.

Although it has not been shown in FIG. 1 for the sake of clarity, it is possible that each of the writing mechanism 24 and 25 and their corresponding analytical circuitries be connected to record an analysis from a single common signal source such as 32 for check purposes. Thus, by duplication of analysis of the same signal source, adjustments may be made to insure the identical behaviour of each writing mechanism and its associated analytical circuitries.

Circuitry to implement the isolator, the integrator, the clamper, the temporary storage element, the voltage-to-time conversion unit, the pen activating circuit and pen mechanism, together with their associated controls is illustrated schematically in FIG. 3. The filter 34 and the amplifier 35 have not illustrated schematically for the reason that their details have not been important to the principles of the invention and their design is well known to those well practiced and skilled in the art of electronic communications circuitry. The same is true of the timer and the associated electroencephalograph machine which serves as a signal source.

With reference now to FIG. 3, it will be observed that the numerals 40, 40' represent the input terminals of the isolator which is connected to the signal source of electroencephalograms. Terminals 40, 40' are coupled to the grid element of triode 45 by means of a capacitor 52 and a resistor 52'. The anode element of the triode 45 is connected directly to a positive supply voltage designated as B+, and the cathode element is connected by means of a resistor 44 to a negative supply voltage designated as B—. It will be recognized by those practiced in the art of electronic circuitry that the triode is thus adapted to provide ample driving impedance for the elements following, while isolating the behavior of such subsequent elements from the signal source connected to terminals 40–40'. Filter 34 is coupled to the isolator by means of a capacitor 46 and a resistor 47.

The output terminals of the filter 34 are coupled to the input terminals of A.C. amplifier 35 for the purpose of boosting the selected component of the signal to a useful voltage level. The output terminals of the A.C. amplifier 35 are connected to the input terminals of a unity-gain D.C. amplifier 54. The D.C. amplifier 54 is required at this point to effectively provide a direct voltage reference or base line to the processed and selected component of the signal in order for a diode 55 to properly rectify or detect the signal applied to it by the D.C. amplifier 54. Furthermore, the unity-grain D.C. amplifier 54 effectively prevents the behaviour of the diode 55 from affecting the behaviour of the A.C. amplifier 35. A variable resistor 53 is provided for adjustment of the operating reference voltage of the unity-gain D.C. amplifier 54 and a resistor 56 completes the path for current flow through the diode 55.

The result of the detection process is a signal in the form of a pulsating direct voltage at the common terminals of resistor 56 and a resistor 57. This signal is applied to the input terminals of the integrator which is seen to include a feedback capacitor 59 connected between input and output terminals of a high gain D.C. amplifier 63. Resistor 57 is seen to be connected between the input of the amplifier 63 and the common terminals of resistor 56 and diode 55. To limit the build up of integrated voltage at the output terminals of the amplifier 63, elements 60–62 have been incorporated. At the end of each integration cycle or epoch, a 0.25 second pulse activates solenoid coil 62 which in turn mechanically closes the contacts of switch 61 allowing the rapid discharge of the integration capacitor 59 through resistor 60. The 0.25 second timing pulse will be referred to as $t_1$ and it is derived within the timing device 39 described in connection with FIG. 2. This timing device may conveniently take the form of an electronic timer incorporating multi-vibrator circuitry.

The output terminal of the integration amplifier 63 is coupled to one of the terminals of a storage capacitor 71 through a resistor 64 and a diode 70, capacitor 71 having the other of its terminals grounded. Also connected to resistor 64 is the anode element of a pentode 69, resistor 64 serving as the load resistor for the pentode whose effective anode voltage supply comprises the output voltage from the integrator amplifier 63. The suppressor grid element of pentode 69 is connected to its cathode element in accordance with standard pentode-amplifier circuit design. The screen grid element of pentode 69 is seen to be connected to a resistive network 67 and 68 which supplies that element with a constant voltage derived from the B+ supply. Finally, the control grid element of pentode 69 is coupled to B— and to a terminal 65′ associated with timer 39 by means of a resistive network 65 and 66. By way of this latter connection, timing signal $t_2$ is applied to the control grid.

The relative potentials of the various elements of pentode 69 are determined by resistors 65–68 such that for zero potential at terminal 65′ representing the source of these timing signals, pentode 69 will have the minimum anode current possible, or in other words will be cut off. When in a cut-off state, the control grid of pentode 69 is baised highly negatively which effectively presents a high impedance between the anode element of pentode 69 and ground. However, when a positive voltage appears at the terminal 65′ current is caused to flow through resistors 65 and 66, thereby raising the control grid element of pentode 69 to nearly zero potential, which has the effect of causing pentode 69 to conduct current heavily through its anode element. Anode current for pentode 69 is supplied through resistor 64 as previously noted. When current flow through resistor 64 to the anode of pentode 69, the potential found at point $x$, the junction of resistor 64 and diode 70 is reduced to near zero for the duration of conduction by the pentode 69. Furthermore, under this condition, it can be seen that diode 70 is no longer in a conductive state owing to the fact that the anode element of diode 70 is at a lower voltage than its cathode element. In effect, therefore, the timing pulse $t_2$ on the control grid of pentode 69 isolates storage capacitor 71 from the behaviour of the integration circuit for the duration of the timing pulse $t_2$.

The non-grounded terminal of storage capacitor 71 is connected to the anode element of a triode 76 whose cathode element is coupled through a resistor 73 to the junction of a pair of voltage dividing resistors 74, 75 between B— and ground. The grid element of triode 76 is connected directly to the terminal 65′. Resistors 73–75 have values adapted to allow triode 76 to exist in a partially conductive state in the presence of the positive timing pulse $t_2$ at the grid element of triode 76. As long as the $t_2$ pulse is present, and provided that the voltage at the non-grounded terminal of storage capacitor 71 is greater than that of the pulse, triode 76 is seen to be connected as a cathode-follower whose grid element is kept at a constant voltage with respect to ground. A cathode-follower in this configuration has the property of possessing a relatively high impedance between its anode element and ground. A high impedance between the non-ground terminal of storage capacitor 71 and ground tends to cause a more linear time-decay of the voltage on capacitor 71 than would be the case otherwise. In addition, the decay of the storage voltage on capacitor 71 has relatively little effect on the anode current by virtue of the action inherent in a cathode follower whose grid to ground voltage is held constant. A substantially constant current discharge by way of triode 76 insures a relatively linear time-decay of the voltage on storage capacitor 71. Hence it follows, that the higher the initial voltage on storage capacitor 71 at the onset of timing pulse $t_2$, the longer it will take for that voltage to decay to a predetermined value. It further follows, that the length of time required for the voltage on storage capacitor 71 to decay to a predetermined value is directly proportional to the content of the signal to be analyzed which corresponds to the selected frequency component. When the $t_2$ timing signal is not present at the grid of triode 76, the triode is biased into a cut off or nonconductive state, allowing relatively little current flow through its anode circuit which in turn insures behavior of the storage capacitor 71 independent of the triode 76 and its accompanying circuitries.

The anode of triode 76 is coupled by means of a resistor 77 to the grid element of a triode 80 whose cathode element is coupled to B junction of resistors 78 and 79 across B+. The anode element of triode 80 is coupled to B+ by way of a solenoid 81 and the anode circuit of a triode 84. The grid element of triode 84 is coupled to the terminal 65′ by means of resistors 82 and 83.

In the presence of the timing signal $t_2$ at the grid of triode 84, triode 84 tends to conduct heavily causing its cathode voltage to become nearly equal its anode voltage, or positive B+. When this condition prevails, the anode element of triode 80 has as its effective load element solenoid 81, and has as its effective positive supply voltage the voltage existing at the cathode element of triode 84, which is very nearly equal to the positive supply voltage B+. Consequently, for positive voltages on the grid element of triode 80 caused by charge on storage element 71, triode 80 conducts current through its anode element circuit during the presence of the $t_2$ timing signal on the grid element circuit of triode 84. Conduction of triode 80 under these circumstances energizes the solenoid 81 causing the closure of switch 85. Further conditions for conduction of triode 80 include the requirement that the grid element to ground voltage of triode 80 be greater than a predetermined value determined in part by resistors 78 and 79 and the positive supply voltage B+. This additional requirement allows the time of conduction of triode 80 to be directly proportional to the voltage stored in capacitor 71, during and only during the application of the timing pulse $t_2$.

Contacts 85 are coupled to a pen power supply 86 and a pen mechanism 87 for activation of the pen 31. It can be seen that the closure of contacts 81 caused by the conduction of triode 81 causes the pen 31 to make a mark on the moving chart by virtue of the pen power supply 86 and the solenoid mechanism 87.

Summarizing the above details, it can be seen that pen 31 makes a mark on the moving chart for a period of time during and only during the timing pulse $t_2$ proportional to the voltage stored on capacitor 71. By virtue of the circuitry associated with triode 84, the cessation of the timing pulse $t_2$ causes pen 31 to cease marking the moving chart in spite of the fact that the voltage stored on capacitor 71 has not decayed to the predetermined value conditioned by the circuitry of triode 80.

In summary of the entire cyclic behaviour, the cycle or epoch begins with the energizing of solenoid 62 which is adapted to close switch 61 for a 0.25 second duration of timing pulse $t_1$ to discharge capacitor 59. The combination of the amplifier 63, resistor 57, and capacitor 59 are, in this way, enabled to perform an integration operation upon the selected frequency component transmitted by the filter 51 and detected by the detector 53–56 during the ensuing epoch. Accordingly, as the epoch proceeds voltage builds up at the integrator amplifier output terminal, and as this process continues, capacitor 71 becomes charged to a corresponding voltage value through the diode 70.

At the end of the ten second epoch, the timing signal $t_2$ at terminal 65′ causes pentode 69 to conduct strongly and thereby preventing the voltage on the anode element of diode 70 from rising above the then existing value. In this way, capacitor 71 is effectively isolated from the amplifier. At the same time, triode 76 is turned on so that capacitor 71 is permitted to discharge through the anode element circuit of triode 76 at a linear rate. Due to configuration of triode 76 with its accompanying circuitry, discharge current from the storage capacitor 71 through triode 76 is kept at a constant value. Also, at the same time that the discharge of capacitor 71 is begun, triode 84 is enabled to conduct sufficiently by the timing signal $t_2$ to allow triode 80 to so conduct thereby energizing the solenoid coil 81 and thus close switch 85 so long as the voltage on the grid element of triode 80 remains above a predetermined value. Under these circumstances pen 31 is caused to write. However, when the voltage on the grid element of triode 80 falls below this predetermined value due to the discharge of storage capacitor 71 through triode 76, insufficient current will flow through triode 80 to maintain solenoid 81 energized. Deactivation of solenoid 81 causes pen 31 to cease writing. The circuitry is arranged so that writing terminates at or before the end of the two second timing signal $t_2$. Subsequent thereto, the solenoid 81 is positively disabled by the switching action on triode 84 and so also does the triode 76, and the pentode 69 become effectively cut off or non-conductive. As a result, capacitor 71 is once again permitted to become charged with the output voltage of the integrator amplifier 63, the storage capacitor 71 voltage becoming substantially equal to the integrator amplifier output voltage by the end of the next ten-second epoch. Upon simultaneous occurrence of the 0.25 and 2.0 timing signals $t_1$ and $t_2$ signifying the end of this epoch, the operations described in the foregoing are then repeated.

Although the invention has been described in connection with a single embodiment, those skilled in the art will appreciate that this embodiment is susceptible of various modifications within the spirit and scope of the invention. Therefore, the invention should not be deemed to be limited to the details of what has been described herein by way of illustration, but rather it should be deemed to be limited only to the scope of the appended claims.

I claim:

1. Apparatus for analyzing the waveforms of electrical signals as said signals are received, and for recording the analysis on a moving chart, said apparatus comprising, means for moving said chart in a predetermined relationship to the time of receipt of said signals, filtering means to transmit selected frequency components of said signals, detection means to derive direct signal voltages from said signal components, integrating means to provide output voltages representing integral functions of said signal voltages, circuit means to cause said output voltages to decay at a predetermined rate to a predetermined level, and writing means to generate traces on said chart which have lengths determined by the decay times of said voltages, whereby each of said traces corresponds with portions of said signals received during a predetermined identifiable time.

2. Apparatus for analyzing the waveforms of electrical signals as said signals are received, and for recording the analysis on a moving chart, said apparatus comprising means for moving said chart in a predetermined relationship to the time of receipt of said signals, filtering means to transmit selected frequency components of said signals, detection means to derive direct signal voltages from said signal components, integrating means to provide output voltages representing integral functions of said voltages, storage means to store said output voltages temporarily, timing means to produce timing signals, circuit means to cause said output voltages to decay at predetermined rates on signal from said timing means, and writing means to generate traces on said chart in response to signals from said timing means, whereby each of said traces corresponds with portions of said signals received during a predetermined identifiable time, said traces having lengths determined by the decay times of said voltages.

3. Apparatus for analyzing the waveforms of electrical signals as said signals are received, and for recording the analysis on a moving chart, said apparatus comprising means for moving said chart in a predetermined relationship to the time of receipt of said signals, filtering means to transmit selected frequency components of said signals, detection means to derive direct signal voltages from said signal components, integrating means to provide output voltages representing integral functions of said signal voltages, storage means to store said output voltages temporarily, timing means to produce timing signals, means to effectively isolate said storage means from said integrating means on signal from said timing means, means to reset said integrating means on signal from said timing means, circuit means to cause said output voltages to decay at predetermined rates on signal from said timing means, and writing means to generate traces on said chart in response to signals from said timing means, whereby each of said traces corresponds with portions of said signals received during a predetermined identifiable time, said traces having lengths determined by the decay times of said voltages.

4. Apparatus for analyzing the waveforms of electrical signals as said signals are received, and for recording the analysis on a moving chart, said apparatus comprising means for moving said chart in a predetermined relationship to the time of receipt of said signals, filtering means to transmit selected frequency components of said signals, detection means to derive direct signal voltages from said signal components, integrating means including a first capacitive circuit to provide output voltages representing integral functions of said signal voltages, storage means including a second capacitive circuit to store said output voltages temporarily, timing means to produce timing signals, means to effectively isolate said second capacitive circuit from said first capacitive circuit on signal from said timing means, means to discharge said first capacitive circuit at a relatively rapid rate on signal from said timing means, means to discharge said second capacitive circuit on signal from said timing circuit at a substantially slower rate than said first capacitive circuit is discharged, and writing means to generate traces on said chart in response to signals from said timing means and output voltages from said storage means so long as the output voltages exceed a predetermined value, whereby each of said traces corresponds with portions of said signals received during a predetermined identifiable time.

5. Apparatus for analyzing the waveforms of electrical signals as said signals are received, and for recording the analysis on a moving chart, said apparatus comprising means for moving said chart in a predetermined relationship to the time of receipt of said signals, filtering means to transmit selected frequency components of said signals, detection means to derive direct signal voltages from said signal components, integrating means including a first capacitive circuit to provide output voltages representing integral functions of said signal voltages, storage means including a second capacitive circuit to store said output voltages temporarily, timing means to produce timing signals, means to effectively isolate said second capacitive circuit from said first capacitive circuit on signal from said timing means, means to discharge said first capacitive circuit at a relatively rapid rate on signal from said timing means, means to discharge said second capacitive circuit on signal from said timing circuit at a substantially slower rate than said first capacitive circuit is discharged, writing means to initiate traces on said chart in response to output voltages which exceed a predetermined value and to terminate said traces when said output voltages decay to a predetermined value, and means responsive to said timing signals to enable and disable said writing means for periodic intervals, whereby each of said traces corresponds with portions of said signals received during a predetermined identifiable time.

6. Apparatus for analyzing the waveforms of electrical signals as said signals are received, and for recording the analysis on a moving chart, said apparatus comprising means for moving said chart in a predetermined relationship to the time of receipt of said signals, a filter to transmit selected frequency components of said signals, a detector circuit coupled to said filter to derive direct signal voltages from said signal components, integrating means coupled to said detector circuit to integrate said direct signal voltages, a resistive circuit selectively coupled to said integrating means to cause the output voltages therefrom to decay at a predetermined rate to a predetermined level, a device to generate traces on said chart, and means to actuate said device in response to output voltages above said predetermined level, whereby each of said traces corresponds with portions of said signals received during a predetermined identifiable time.

7. Apparatus for analyzing the waveforms of electrical signals as said signals are received, and for recording the analysis on a moving chart, said apparatus comprising means for moving said chart in a predetermined relationship to the time of receipt of said signals, a filter to transmit selected frequency components of said signals, a detector circuit coupled to said filter to derive direct signal voltages from said signal components, an amplifier coupled to said detector, said amplifier incorporating a capacitive feedback circuit to effect integration of said direct signal voltages, a first resistive circuit selectively coupled to said feedback circuit to discharge the same, a capacitive storage circuit to store temporarily output signals from said amplifier, means to couple and decouple said amplifier and said storage circuit, a second resistive circuit selectively coupled to said storage circuit to cause the output voltages stored thereby to decay at a predetermined rate to a predetermined level, said rate of decay of the output voltages from said storage circuit being substantially slower than that of the output voltages from said amplifier, a device to generate traces on said chart, and means to actuate said device in response to output voltages above said predetermined level, whereby each of said traces corresponds with portions of said signals received during a predetermined identifiable time.

8. Apparatus for use with electroencephalographic signals to provide an analysis of said signals, said apparatus comprising a moving chart, said chart moving in a predetermined relationship to the time of receipt of said signals, a linear array of writing pens disposed transversely of the direction of moment of the chart, and a plurality of signal channels to control the operation of said writing pens, each of said channels including; a filter to transmit selected frequency components of said signals, a detector to derive direct signal voltage from said component, an amplifier coupled to said detector, said amplifier incorporating a capacitive feedback circuit to effect integration of said direct signal voltages, a first resistive circuit selectively coupled to said feedback circuit to discharge the same, a capacitance storage circuit to store temporarily output signals from said amplifier, means to couple and decouple said amplifier and said storage circuit, a second resistive circuit selectively coupled to said storage circuit to cause the output voltages stored thereby to decay at a predetermined rate to a predetermined level, said rate of decay of the output voltages from said storage circuit being substantially slower than that of the output voltages from said amplifier, an electro-mechanical device to cause each pen to generate a linear trace, a selectively actuated write-out circuit to energize said device in response to output voltages above said predetermined level, and a timer to selectively actuate said write-out circuit for predetermined periods of substantially less duration than the intervals between said periods.

9. Apparatus for use with electroencephalographic signals to provide an analysis of said signals, said apparatus comprising a moving chart, said chart moving in a predetermined relationship to the time of receipt of said signals, a linear array of writing pens disposed transversely of the direction of movement of said chart, and a plurality of signal channels to control the operation of said writing pens, each of said channels including; a filter to transmit selected frequency components of said signals, a detector to derive direct signal voltage from said component, an amplifier coupled to said detector, said amplifier incorporating a capacitive feedback circuit to effect integration of said direct signal voltages, a timing circuit, a first resistive circuit selectively coupled to said feedback circuit to discharge said feedback circuit, a capacitive storage circuit to store temporarily output signals from said amplifier, means responsive to signals from said timing circuit to couple and decouple said amplifier and said storage circuit, a second resistive circuit selectively coupled to said storage circuit to cause the output voltages stored thereby to decay at a predetermined rate to a predetermined level, said second resistive circuit being coupled in response to signals from said timing circuit, said rate of decay of the output voltages from said storage circuit being substantially slower than that of the output voltages from said amplifier, an electromechanical device to cause each pen to generate a linear trace, and a write-out circuit actuated in response to signals from said timing circuit to energize said electromechanical device in response to output voltages above said predetermined level.

10. Apparatus for analyzing the wave forms of electrical signals and for recording the analysis on a moving chart, said apparatus comprising means for moving said chart in a predetermined relationship to the time of receipt of said signals, a plurality of filtering means, each of said filtering means transmitting a selected frequency component of said signals, a plurality of detection means, one of said detection means being associated with each of said filtering means to derive a direct signal voltage from said frequency component, a plurality of integrating means, one of said integrating means being associated with each of said detection means to provide an output voltage representing an integral function of said signal voltage, a plurality of circuit decay means, one of said circuit decay means being associated with each of said integrating means to cause said output voltage to decay at a predetermined rate to a predetermined level, and a plurality of writing means, one of said writing means being associated with each of said circuit decay means to generate a trace on said chart which has a length determined by the decay time of said voltage, whereby each of said traces corresponds with portions of said signals received during a predetermined identifiable time.

11. Apparatus for analyzing the wave forms of electrical signals as said signals are received, and for recording the analysis on a moving chart, said apparatus comprising means for moving said chart in a predetermined relationship to the time of receipt of said signals, a plurality of filtering means, each of said filtering means transmitting a selected frequency component of said signals, a plurality of detection means, one of said detection means being associated with each of said filtering means to derive a direct signal voltage from said frequency component, a plurality of integrating means, one of said integrating means being associated with each of said detection means to provide an output voltage representing integral functions of said voltage, a plurality of storage means, one of said storage means being associated with each of said integrating means to store said output voltage temporarily, timing means to produce timing signals, a plurality of circuit decay means, one of said circuit decay means being associated with each of said storage means to cause said output voltage to decay at a predetermined rate on signal from said timing means, and a plurality of writing means, one of said writing means being associated with each of said circuit decay means to generate a trace on said chart in response to signals from said timing means, whereby each of said traces corresponds with portions of said signals received during a predetermined identifiable time, said traces having lengths determined by the decay times of said voltages.

12. Apparatus for analyzing the wave forms of electrical signals as said signals are received, and for recording the analysis on a moving chart, said apparatus comprising means for moving said chart in a predetermined relationship to the time of receipt of said signals, a plurality of filters, each of said filters transmitting a selected frequency component of said signals, a plurality of detector circuits, one of said detector circuits being coupled to each of said filters to derive a direct signal voltage from said frequency component, a plurality of integrating means, one of said integrating means being coupled to each of said detector circuits to integrate said direct signal voltage, a plurality of resistive circuits, one of said resistive circuits being selectively coupled to each of said integrating means to cause the output voltage therefrom to decay at a predetermined rate to a predetermined level, a plurality of trace generating devices, one of said devices being connected to each of said resistive circuits to generate a trace on said chart, and means to actuate said devices in response to output voltages above said predetermined level, whereby each of said traces corresponds with portions of said signals received during a predetermined identifiable time.

References Cited by the Examiner

UNITED STATES PATENTS

| | | | |
|---|---|---|---|
| 2,159,790 | 5/39 | Freystedt | 324—77 |
| 2,285,482 | 6/42 | Wunsch | 324—111 |
| 2,582,851 | 1/52 | Ruge | 324—77 |
| 2,619,590 | 11/52 | Williams | 324—77 |
| 2,906,955 | 9/59 | Edson | 324—77 |
| 2,915,705 | 12/59 | Sweet | 324—111 |
| 2,951,203 | 8/60 | Tillman et al. | 333—19 X |
| 2,958,822 | 11/60 | Rogers et al. | 324—77 |
| 2,967,274 | 1/61 | Hurvitz | 324—77 |
| 3,051,898 | 8/62 | Eynon | 346—13 X |

WALTER L. CARLSON, *Primary Examiner.*

SAMUEL BERNSTEIN, *Examiner.*